(12) United States Patent
Zhuang et al.

(10) Patent No.: US 10,772,066 B2
(45) Date of Patent: Sep. 8, 2020

(54) METHOD OF AUTOMATICALLY SWITCHING MODE OF RECEIVING DIFFERENTIAL DATA FOR DRIVING TEST AND DRIVING TRAINING USING A MOBILE STATION

(71) Applicant: SHANGHAI HUACE NAVIGATION TECHNOLOGY LTD, Shanghai (CN)

(72) Inventors: Hao Zhuang, Shanghai (CN); Zhiqiang Fang, Shanghai (CN); Jiejun Wang, Shanghai (CN); Huazhong Xie, Shanghai (CN); Kangde Zhao, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 121 days.

(21) Appl. No.: 16/086,319

(22) PCT Filed: Jun. 20, 2017

(86) PCT No.: PCT/CN2017/089131
§ 371 (c)(1),
(2) Date: Sep. 19, 2018

(87) PCT Pub. No.: WO2018/076724
PCT Pub. Date: May 3, 2018

(65) Prior Publication Data
US 2019/0104494 A1 Apr. 4, 2019

(30) Foreign Application Priority Data
Oct. 27, 2016 (CN) .......................... 2016 1 0957076

(51) Int. Cl.
*H04W 64/00* (2009.01)
*H04W 88/06* (2009.01)
(Continued)

(52) U.S. Cl.
CPC .......... *H04W 64/003* (2013.01); *G01S 5/009* (2013.01); *H04W 88/06* (2013.01); *G09B 19/167* (2013.01)

(58) Field of Classification Search
CPC ......... H04W 4/40; H04W 4/02; H04W 4/021; H04W 4/48; H04W 76/10
See application file for complete search history.

(56) References Cited

U.S. PATENT DOCUMENTS 8,909,388 B1 * 12/2014 Kim .................... B60W 40/076
 701/1
10,162,693 B1 * 12/2018 Contino .............. G06F 11/0748

FOREIGN PATENT DOCUMENTS

CN 201142014 Y 10/2008
CN 201532460 U 7/2010
(Continued)

*Primary Examiner* — Kwasi Karikari
(74) *Attorney, Agent, or Firm* — Bayramoglu Law Offices LLC

(57) ABSTRACT

A method of automatically switching a mode of receiving differential data for driving test and driver training using a mobile station includes the following steps of: after a mobile station installed on a training vehicle is powered on, using a mode of receiving the differential data by a radio station; if the differential data cannot be received within a preset time period under the mode, switching the radio station to a GPRS mode; if the radio station of the mobile station receives failure information, feeding the information back to a back-end server by the mobile station; informing a technician, by the back-end server, to perform troubleshooting, after the radio station failure is eliminated, feeding information back to the mobile station through the back-end server, and switching the mobile station back to the mode of receiving the differential data by the radio station.

2 Claims, 1 Drawing Sheet

(51) Int. Cl.
*G01S 5/00* (2006.01)
*G09B 19/16* (2006.01)

(56) References Cited

FOREIGN PATENT DOCUMENTS

| | | |
|---|---|---|
| CN | 104698482 A | 6/2015 |
| CN | 103559805 B | 3/2016 |
| EP | 1363470 A1 | 11/2003 |
| JP | 2009171348 A | 7/2009 |

* cited by examiner

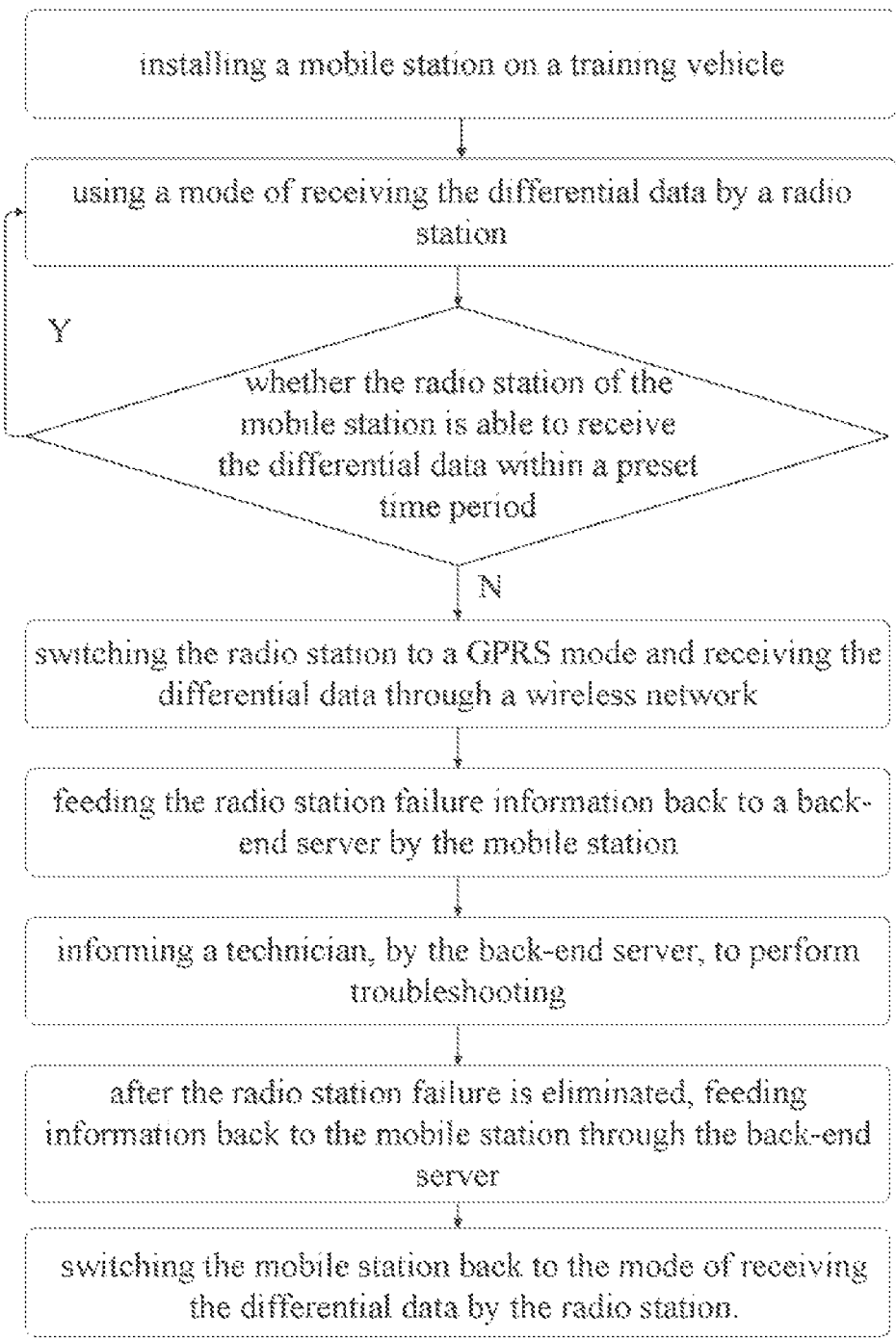

METHOD OF AUTOMATICALLY SWITCHING MODE OF RECEIVING DIFFERENTIAL DATA FOR DRIVING TEST AND DRIVING TRAINING USING A MOBILE STATION

CROSS REFERENCE TO RELATED APPLICATIONS

This application is the national phase entry of International Application PCT/CN2017/089131, filed on Jun. 20, 2017 which is based upon and claims priority to Chinese Patent Application No. 201610957076.2, filed on Oct. 27, 2016 the entire contents of which are incorporated herein by reference.

TECHNICAL FIELD

The present invention relates to the field of surveying and mapping, in particular to a method of automatically switching a mode of receiving differential data for driving test and driving training using a mobile station.

BACKGROUND

With the development of modern science and technology and the improvement of people's living standards, more and more people take a driving test, and driver training for the driving test is indispensable. For a driving exam that uses a traditional method, a powerful reference station is set up at a relatively higher place and a mobile station is installed on a training vehicle. The reference station sends differential data through a radio station, and the mobile station receives the differential data through the radio station, so as to carry out RTK resolving and obtain a fixed solution of the positioning state. After that, positioning information with centimeter-level positioning accuracy can be obtained. However, when more than one reference station is used at the same site, it is very easy to cause crosstalk. Moreover, when the field is large enough, floating solution of the positioning state will occur in the region out of the transmission range of the radio station. In this case, the positioning accuracy is of meter level, which will affect the accuracy of judgment in the training and examination.

SUMMARY

The present invention provides a method of automatically switching the mode of receiving differential data for a driving test and driver training using the mobile station. The objective of the present invention is to automatically switch the communication mode when the mobile station is unable to receive the differential data transmitted by the reference station through a radio station. By using a 2g/3g module and logging into a Cross-origin resource sharing (CORS) account, the differential data is transmitted to the mobile station through a Transmission Control Protocol (TCP)/IP transmission mode. Furthermore, a socket is established to transmit the differential data information that is unable to be received by transmitting through the radio station to a back end, so that a staff of the driver training school can timely adjust the status of the radio station of the reference station, conveniently. After the staff of the driver training school makes sure that the signal channel and power of the radio station are normal, the staff can send a message through the back end to switch the corresponding mobile station back to the radio station transmission mode, so that the positioning state of the mobile station is kept at a fixed solution. In this way, an automatic failure detection of the radio station can be realized, and the staff of the driver training school is not required to stare at the positioning data all the time, thereby greatly saving manpower.

In order to realize the above-mentioned technical solution, the technical solution of the present invention is as follows.

A method of automatically switching a mode of receiving differential data for driving test and driving training using a mobile station includes the following steps:

installing a mobile station on a training vehicle;

after the mobile station is powered on, using a mode of receiving the differential data by a radio station; if the radio station of the mobile station is unable to receive the differential data within a preset time period under the mode, switching the radio station to a General Packet Radio Service (GPRS) mode and receiving the differential data through a wireless network;

if the radio station of the mobile station receives failure information, feeding the radio station failure information back to a back-end server by the mobile station;

informing a technician, by the back-end server, to perform troubleshooting, after the radio station failure is eliminated, feeding information back to the mobile station through the back-end server, and switching the mobile station back to the mode of receiving the differential data by the radio station.

According to the above-mentioned method of automatically switching the mode of receiving differential data for the driving test and driver training using the mobile station, after the radio station is switched to the GPRS mode, a TCP connection is established and a CORS account is logged in, and the differential data is received through the wireless network.

According to the method of automatically switching the mode of receiving differential data for the driving test and driver training using the mobile station, the mobile station feeds back the radio station failure to the back-end server through GSM, 3G or 4G networks.

In the present invention, the technician is merely required to observe the back-end information and eliminate the radio station failure when receiving the radio station failure information fed back by the mobile station. In this process, the mobile station has been switched to the GPRS mode, thus providing a reliable guarantee for accurate positioning in the driving test and precious time for eliminating the radio station failures, as well as saving manpower.

BRIEF DESCRIPTION OF THE DRAWING

The present invention and the characteristic, appearance and advantages thereof will become more apparent by reading the detailed description of a non-limiting embodiment with reference to the following drawing. In the drawing, identical reference numerals indicate identical parts. The drawing is not particularly drawn according to specific proportion and the main spirit of the drawing is to depict the substance of the present invention.

The drawing is a flowchart showing the method of automatically switching the mode of receiving differential data for a driving test and driver training using a mobile station.

DETAILED DESCRIPTION OF THE EMBODIMENTS

In the following description, numerous specific details are given for a complete understanding of the present invention.

However, it is apparent to those skilled in the art that the present invention may be implemented without one or more of these details. In other examples, in order to avoid mixing up with the present invention, some technical features known in the art are not described.

For a complete understanding of the present invention, detailed steps and detailed structures will be provided in the following description in order to clearly illustrate the technical solution of the present invention. A preferred embodiment of the present invention is described in detail hereinafter. However, besides these detailed descriptions, the present invention may have other implementations.

The present invention provides a method of automatically switching a mode of receiving differential data for a driving test and driver training using a mobile station, which includes the following steps.

Step S1: a mobile station is installed on a training vehicle.

Step S2: after the mobile station is powered on, the mode of receiving the differential data by a radio station is used. If the radio station of the mobile station is unable to receive the differential data within a preset time period under the mode, the radio station is switched to a GPRS mode and the differential data is received through a wireless network. In an alternative embodiment of the present invention, after the radio station is switched to the GPRS mode, a TCP connection is established and a CORS account is logged in, so as to receive the differential data through the wireless network.

Step S3: if the radio station of the mobile station receives failure information, the radio station failure is fed back to the back-end server by the mobile station. In an alternative embodiment of the present invention, the radio station failure is fed back to the back-end server through GSM, 3G or 4G networks by the mobile station.

Step S4: a technician of the driver training school receives the feedback problem and solves the problem. After the radio station failure is eliminated, the information is fed back to the mobile station through the back-end server. The mobile station automatically switches back to the mode of receiving the differential data by the radio station.

In the present invention, the technician is merely required to observe the back-end information and eliminate the radio station failure when receiving the radio failure information fed back by the mobile station. In this process, the mobile station has been switched to the GPRS mode, thereby providing a reliable guarantee for accurate positioning in the driving test and precious time for eliminating radio station failures, and saving manpower.

The preferred embodiment of the present invention has been described above. It should be understood that the present invention is not limited to the specific embodiments described above, and devices and structures that are not described in detail herein, but should be understood as being implemented in a common manner known in the art. Various possible changes and modifications or equivalent embodiments obtained by equivalent substitutions may be derived from the technical solution of the present invention according to the method and technical features recited above without departing from the technical solution of the present invention by any skilled person in the art, which do not have any impact on the essence of the present invention. Therefore, any simple modification, equivalent substitution and modification made based upon the above embodiment according to the technical essence of the present invention without departing from the content of the technical solution of the present invention should still be considered as falling within the scope of the technical solution of the present invention.

What is claimed is:

1. A method of automatically switching a mode of receiving differential data for a driving test and driver training using a mobile station comprising:

installing a mobile station on a training vehicle;

after the mobile station is powered on, using a mode of receiving the differential data by a radio station;

if the radio station of the mobile station is unable to receive the differential data within a preset time period under the mode, switching the radio station to a General Packet Radio Service (GPRS) mode and receiving the differential data through a wireless network;

if the radio station of the mobile station receives radio station failure information, feeding the radio station failure information back to a back-end server by the mobile station;

informing a technician, by the back-end server, to perform troubleshooting, after the radio station failure is eliminated;

feeding information of an elimination of the radio station failure back to the mobile station through the back-end server; and switching the mobile station back to the mode of receiving the differential data by the radio station; wherein after the radio station is switched to the GPRS mode, a Transmission Control Protocol (TCP) connection is established and a Cross-origin resource sharing (CORS) account is logged in, and the differential data is received through the wireless network.

2. A method of automatically switching a mode of receiving differential data for a driving test and driver training using a mobile station comprising:

installing a mobile station on a training vehicle;

after the mobile station is powered on, using a mode of receiving the differential data by a radio station;

if the radio station of the mobile station is unable to receive the differential data within a preset time period under the mode, switching the radio station to a General Packet Radio Service (GPRS) mode and receiving the differential data through a wireless network;

if the radio station of the mobile station receives radio station failure information, feeding the radio station failure information back to a back-end server by the mobile station;

informing a technician, by the back-end server, to perform troubleshooting, after the radio station failure is eliminated;

feeding information of an elimination of the radio station failure back to the mobile station through the back-end server; and switching the mobile station back to the mode of receiving the differential data by the radio station; wherein the mobile station feeds back the radio station failure information to the back-end server through one of GSM, 3G or 4G network.

* * * * *